United States Patent
Lem et al.

(10) Patent No.: US 10,773,609 B2
(45) Date of Patent: Sep. 15, 2020

(54) METHOD FOR ADJUSTING THE SEAT OF A VEHICLE

(71) Applicant: Ford Global Technologies, LLC, Dearborn, MI (US)

(72) Inventors: Jeroen Lem, Masstricht (NL); Philipp Wolf, Cologne (DE); Nikica Hennes, Aachen (DE)

(73) Assignee: Ford Global Technologies, LLC, Dearborn, MI (US)

(*) Notice: Subject to any disclaimer, the term of this patent is extended or adjusted under 35 U.S.C. 154(b) by 153 days.

(21) Appl. No.: 15/896,331

(22) Filed: Feb. 14, 2018

(65) Prior Publication Data

US 2018/0297488 A1     Oct. 18, 2018

(30) Foreign Application Priority Data

Apr. 12, 2017  (DE) .......................... 10 2017 206313

(51) Int. Cl.
| | | |
|---|---|---|
| *B60N 2/02* | (2006.01) | |
| *B60R 16/037* | (2006.01) | |
| *B60N 2/00* | (2006.01) | |
| *B60N 2/90* | (2018.01) | |
| *B60N 2/18* | (2006.01) | |
| *B60N 2/22* | (2006.01) | |

(52) U.S. Cl.
CPC .......... *B60N 2/0232* (2013.01); *B60N 2/002* (2013.01); *B60N 2/0244* (2013.01); *B60N 2/18* (2013.01); *B60N 2/22* (2013.01); *B60N 2/914* (2018.02); *B60R 16/037* (2013.01); *B60N 2002/0268* (2013.01)

(58) Field of Classification Search
CPC .... B60N 2/0232; B60N 2/0244; B60N 2/914; B60N 2/002; B60N 2/18; B60N 2/22; B60N 2002/0268; B60R 16/037
See application file for complete search history.

(56) References Cited

U.S. PATENT DOCUMENTS

| | | | |
|---|---|---|---|
| 4,204,255 | A | 5/1980 | Cremer |
| 5,822,707 | A | 10/1998 | Breed et al. |
| 6,053,270 | A | 4/2000 | Nishikawa et al. |
| 6,450,530 | B1 | 9/2002 | Frasher et al. |
| 7,164,117 | B2 | 1/2007 | Breed et al. |
| 7,422,285 | B2 | 9/2008 | Phipps |

(Continued)

FOREIGN PATENT DOCUMENTS

| | | |
|---|---|---|
| DE | 3541537 A1 | 6/1986 |
| DE | 19605779 A1 | 7/1996 |

(Continued)

OTHER PUBLICATIONS ("Pressure Mapping, Force Measurement & Tactile Sensors," Tekscan. com, Apr. 2016, Available: https://web.archive.org/web/20160423002109/https://www.tekscan.com/products-solutions/systems/body-pressure-measurement-system-bpms-research?tab=sensors (Year: 2016).*

*Primary Examiner* — Russell Frejd
(74) *Attorney, Agent, or Firm* — David Coppiellie; Price Heneveld LLP

(57) ABSTRACT

A method for adjusting a seat of a vehicle is disclosed. The method includes the step of capturing loading data of the seat, evaluating the loading data to determine a control dataset for periodically adjusting the seat based on the control dataset.

14 Claims, 4 Drawing Sheets

(56) References Cited

U.S. PATENT DOCUMENTS

| | | | | |
|---|---|---|---|---|
| 7,976,060 B2* | 7/2011 | Breed | .................... | B60N 2/002 |
| | | | | 180/273 |
| 8,616,654 B2 | 12/2013 | Zenk et al. | | |
| 8,820,782 B2* | 9/2014 | Breed | ...................... | B60J 10/00 |
| | | | | 280/735 |
| 8,874,301 B1 | 10/2014 | Rao et al. | | |
| 8,958,955 B2* | 2/2015 | Hotary | .................... | B60N 2/809 |
| | | | | 701/49 |
| 10,549,662 B2* | 2/2020 | Iyer | ......................... | H05B 3/34 |
| 2003/0060957 A1 | 3/2003 | Okamura et al. | | |
| 2004/0240776 A1* | 12/2004 | Baur | ...................... | B60N 2/002 |
| | | | | 385/16 |
| 2005/0110348 A1 | 5/2005 | Hijikata et al. | | |
| 2007/0085697 A1 | 4/2007 | Breed | | |
| 2010/0101026 A1* | 4/2010 | Papaioannou | ....... | A61G 7/0573 |
| | | | | 5/710 |
| 2011/0098890 A1 | 4/2011 | Lee et al. | | |
| 2012/0277990 A1 | 11/2012 | Gottsch et al. | | |
| 2015/0006014 A1 | 1/2015 | Wimmer et al. | | |
| 2015/0120124 A1 | 4/2015 | Bartels et al. | | |
| 2015/0145296 A1 | 5/2015 | Hotary et al. | | |
| 2015/0307105 A1 | 10/2015 | Huber | | |
| 2016/0159251 A1* | 6/2016 | Ebina | .................... | B60N 2/0244 |
| | | | | 701/49 |
| 2016/0246298 A1 | 8/2016 | Sato et al. | | |
| 2016/0272092 A1* | 9/2016 | Obadia | .................. | B60N 2/914 |
| 2016/0304009 A1* | 10/2016 | Ogiso | ...................... | B60N 2/62 |
| 2017/0110022 A1 | 4/2017 | Gulash | | |
| 2017/0313208 A1* | 11/2017 | Lindsay | ............... | B60N 2/0244 |
| 2018/0029503 A1* | 2/2018 | Dhaini | ................ | B60N 2/0244 |
| 2018/0178693 A1* | 6/2018 | Iyer | ...................... | H05B 1/0238 |
| 2019/0366878 A1* | 12/2019 | Dhaini | .................. | B60N 2/646 |

FOREIGN PATENT DOCUMENTS

| | | |
|---|---|---|
| DE | 19806535 A1 | 8/1998 |
| DE | 19811959 A1 | 9/1999 |
| DE | 10336316 A1 | 3/2005 |
| DE | 102006018184 A1 | 10/2007 |
| DE | 102015206501 A1 | 10/2016 |
| DE | 102016206626 A1 | 11/2016 |
| DE | 102015216100 A1 | 3/2017 |
| FR | 2860759 A1 | 4/2005 |
| JP | 2008230366 A | 10/2008 |
| JP | 2016037107 A | 3/2016 |
| WO | 97042860 A1 | 11/1997 |
| WO | 2012048100 A2 | 4/2012 |

\* cited by examiner

METHOD FOR ADJUSTING THE SEAT OF A VEHICLE

FIELD OF THE INVENTION

The present invention generally relates to a seat of a vehicle, and more particularly relates to a method of adjusting the seat based on the load.

BACKGROUND OF THE INVENTION

For some seated vehicle occupants, sitting on a seat of a vehicle in the same seat position can be uncomfortable or even painful, particularly during relatively long travel journeys. In order to provide a remedy to the seating discomfort, it is known from U.S. Pat. No. 7,422,285 B2 to change the seat position by activating actuator motors of a seat. However, specific characteristics of the respective people generally seated on the seat are not taken into account such that, although changes in the seat position are experienced as agreeable by some people, they are experienced as disagreeable by other people.

It would be desirable to provide approaches to changing the seat position of the seat that can be adapted in a personalized fashion to effectively reduce such seating discomfort.

SUMMARY OF THE INVENTION

According to one aspect of the present invention, a method for adjusting the seat of a vehicle is provided. The method includes the steps of capturing loading data of the seat, and evaluating the loading data to determine a control dataset, and periodically adjusting the seat based on the control dataset.

Loading data of the seat are thus captured which are evaluated to determine a control dataset and a seat control device is activated in order to move the seat and thus effect a periodic change in the seat position. The loading data are created by the respective person located on the seat. Specific characteristics of the respective people on the seat are taken into account by capturing and evaluating the loading data such that changes in the seat position can be designed in a personalized fashion. Moreover, the posture of the person located on the seat can thus also be captured.

According to one embodiment, the loading data may contain data on pressure distribution on the seat. In other words, the loading data may contain information on a two- or three-dimensional pressure distribution produced by a two- or three-dimensional weight distribution.

According to an exemplary embodiment, a pressure sensor module is used in order to obtain the loading data. The pressure sensor module enables direct collection of the pressure distribution. The pressure sensor module can have capacitive, piezoelectric, fiber optic, or pressure-resistive and other pressure-sensitive sensors.

According to a further embodiment, the control dataset contains data relating to a seat movement model. The seat movement model can have specifications for the seat as a whole and/or its components, for example the respective target positions, target angles, repetition frequencies of seat movement models, respective movement speeds, and/or a respective interval duration. Particularly complicated seat movement models can also be produced.

According to a further embodiment, changes in the loading data are captured and evaluated. Movement of a person located on the seat can thus be captured. Such movement can also be considered as an indicator that the person located on the seat is indeed located in a seat position that is uncomfortable for them, as a result of which a change in the seat position may then be initiated.

According to a further embodiment, driver behavior is captured and taken into account when determining the control dataset. For example, depressing a pedal such as, for example, depressing a brake pedal can be captured together with the pressure distribution as driver behavior. When the evaluation shows that the person located on the seat is located on a front portion of the seat surface of the seat, it can be considered as an indicator that the seat height needs to be reduced. It can moreover be provided that, after the driver behavior has ended, the original seat position is restored.

According to another aspect of the present invention, a seat control device for adjusting a seat of a vehicle is provided. The seat control device includes adjusting a seat of a vehicle, wherein the seat control device is configured to capture and evaluate loading data of the seat in order to determine a control dataset, and to periodically adjust the seat based on the control dataset.

According to a further aspect of the present invention, a seat for a vehicle is provided. The seat includes a sensor capturing loading data of the seat, and a seat control device to evaluate the loading data of the seat and determine a control dataset, and to periodically adjust the seat based on the control dataset.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
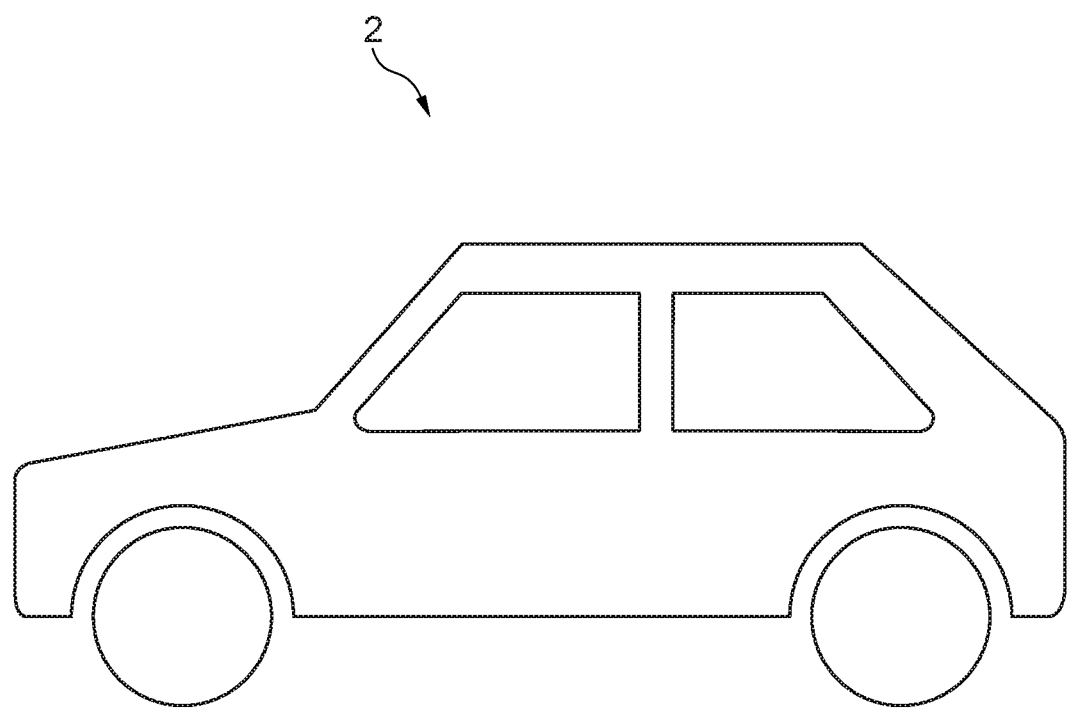
FIG. 1 is a schematic view of a vehicle according to an exemplary embodiment.

Referring now to FIG. 1, one example of a vehicle 2 which is a means of transport is shown. In the present exemplary embodiment, the vehicle 2 is a motor vehicle such as, for example, a car. As a variant on the present exemplary embodiment, the vehicle 2 can also be a commercial vehicle such as a truck or a bus. The vehicle 2 can moreover also be an airplane, train, ship or other vehicle having one or more seats for seating passengers.

The vehicle 2 can be designed to be a self-driving or autonomous vehicle. A self-driving vehicle 2 can here be understood to be a vehicle which can be driven, controlled, and parked without any input from a human driver (highly automated driving or self-driving). The driver's seat in a self-driving vehicle can remain empty, and a steering wheel, brake pedal, and accelerator may then be absent.

The self-driving vehicle 2 can capture the surroundings of the vehicle with the aid of a range of sensors (not shown) and determine the position of the vehicle and other traffic from the information obtained, navigate to a destination in conjunction with the navigation software, and avoid collisions on the route to the destination.

Figure 2:
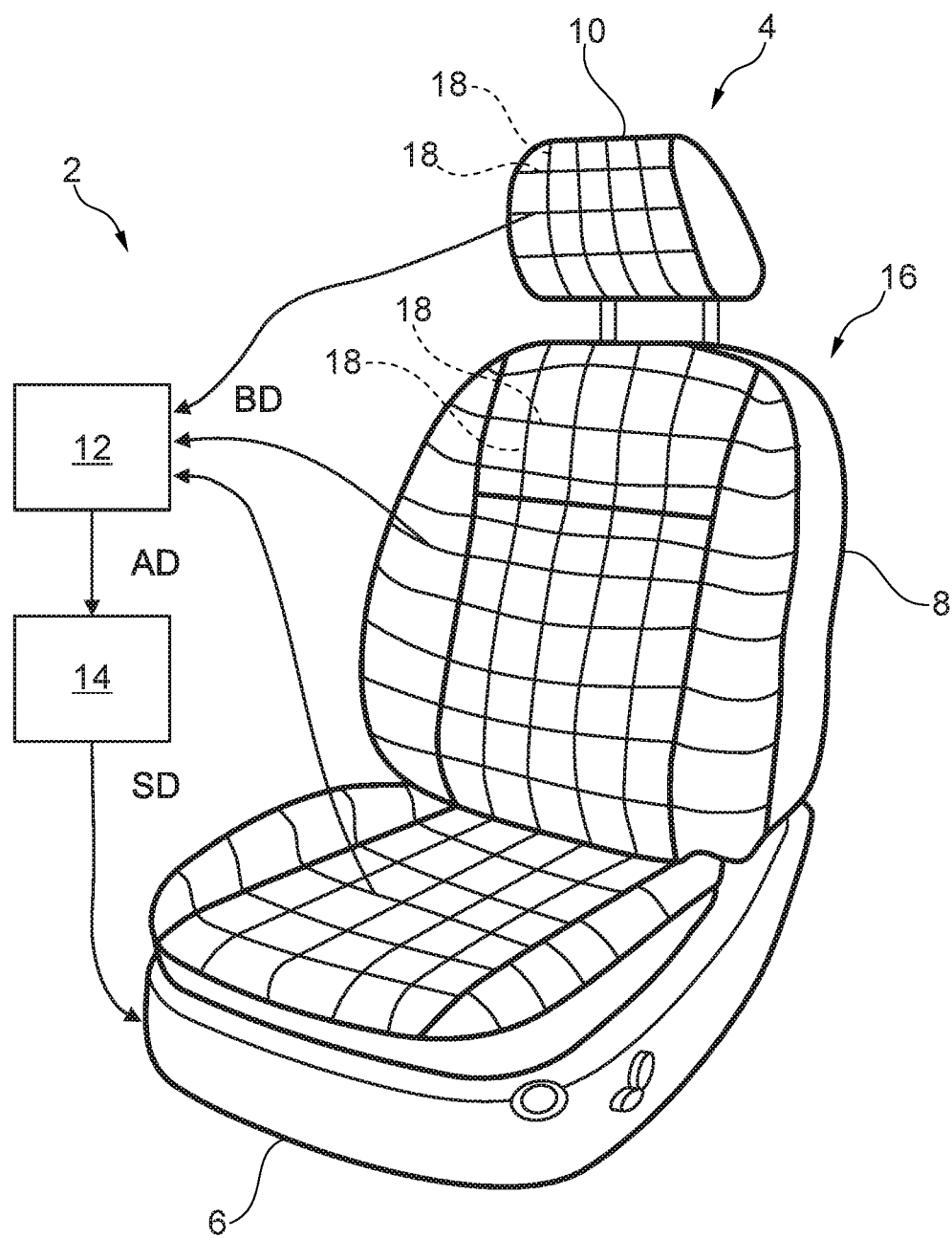
FIG. 2 is a schematic view of a seat of the vehicle shown in FIG. 1 and seat controls for adjusting the seat.

Referring to FIG. 2, a seat 4 of the vehicle 2 is shown equipped with seat controls for adjusting the seat. In the present exemplary embodiment, the seat 4 is a driver's seat configured to seat the driver of the vehicle. The seat 4 can, however, be a front passenger seat or a passenger seat arranged in the back of the vehicle or elsewhere in the vehicle.

In the present exemplary embodiment, the seat 4 has a seat surface 6, a backrest 8, and a headrest 10 which are in each case configured so that they can be adjusted, wherein in each case a drive such as, for example, an electric motor (not shown) is provided to actuate and thereby adjust the seat. In other words, the seat 4 has an electric seat adjustment system, according to one embodiment. The extent and sophistication of the electric seat adjustment system are largely dependent on the level of comfort and equipment of the respective vehicle 2.

In the present exemplary embodiment, the electric seat adjustment system is designed as a 6-way adjustment system which makes it possible to move the seat as a whole forward and backward on seat rails in order to allow people with different body sizes to satisfactorily operate the driver control pedals for the accelerator, the brake, and where appropriate the clutch of the vehicle 2. Moreover, in the present exemplary embodiment the rake of the backrest 8 forward and backward and the height of the seat can be adjusted. As an alternative to the present exemplary embodiment, the seat 4 can also have just a 2-way adjustment system or a 4-way adjustment system.

In a 2-way adjustment system, the seat 4 can only be moved forward and backward, while in a 4-way adjustment system the seat 4 can be adjusted horizontally forward and backward and the rake of the backrest 8 can be adjusted forward and backward.

Furthermore, as an alternative to the present exemplary embodiment, the seat 4 can also have a 10-way adjustment system or a 16-way adjustment system. As well as forward/backward adjustment, a 10-way adjustment system allows, for example, alteration of the seat height and depth, backrest rake, and lumbar support, while as well as forward/backward adjustment, a 12-way adjustment system allows alteration of the seat height and depth, seat surface and backrest rake, and lumbar support. Lastly, as well as forward/backward adjustment, an 18-way adjustment system allows, for example, alteration of the seat height and depth, seat surface and backrest rake, upper seat back and lumbar support, headrest height and moreover the seat surface depth.

Alternatively, a 30- or 32-way adjustment system or any combination of the respective individual adjustment options can also be provided. The adjustment options can comprise six options for altering a lower cushion of the seat 4 (forward/backward, raising/lowering the front edge, raising/lowering the rear edge of the cushion), and/or two options for adjusting the backrest 8 (raising/reclining), and/or four options for adjusting the headrest 10 (forward/backward, up/down), and/or two options for altering the upper back support (forward/backward rake), and/or four options for adjusting the lower seat cushion extensions (two telescopic segments which move independently forward/backward), and/or four options for altering thigh supports, and/or four options for altering the lumbar support (up/down, inflate/deflate), and/or two options for adjusting the backrest side pads and/or two options for retracting and extending the lower seat cushions.

It can moreover be provided that, as well as the seat 4, the position of an armrest and/or a steering wheel setting(s) can also be altered correspondingly. Furthermore, pneumatic air cells of the seat 4, mirror adjustments, pedal positions, footrest positions, foot support positions, tray positions, device holder positions, alterations in the neck area, or other setting options can be adjusted or altered.

A seat control device 12 and a seat control system 14 are moreover associated with the seat 4 and are used to adjust the seat. The seat control device 12 and the seat control system 14 can have hardware and/or software components for the functions and/or tasks described below.

Furthermore, the seat surface 6, the backrest 8, and the headrest 10 have a pressure sensor module 16 for capturing loading data BD. For this purpose, in the present exemplary embodiment the pressure sensor module 16 has multiple pressure-sensitive fiber optic cables 18 which are arranged in a grid pattern. A compressive load produced by a weight-induced load can thus be dispersed in two or three dimensions. In other words, the loading data BD contain information on a two- or three-dimensional pressure distribution.

The loading data BD captured by sensing by the pressure sensor module 16 are read by the seat control device 12. The seat control device 12 is configured to evaluate the loading data BD of the seat 4 in order to determine a control dataset AD for periodically adjusting the seat 4.

The control dataset AD contains data which specify a seat movement model of the seat 4 and/or its components, e.g., the seat surface 6, the backrest 8, and the headrest 10. The control dataset AD can contain information on the respective target positions, target angles, and/or movement speeds of the seat 4, and/or its components, as well as repetition frequencies of seat movement models and/or a respective interval duration.

The seat control device 12 can be configured to determine the control dataset AD in such a way as to effect a compensation when there is a pressure distribution in which a front seat surface portion has a lower load than a rear seat surface portion. The seat control device 12 can moreover be designed to determine the control dataset AD in such a way that, for example, a ratio of a pressure distribution on the backrest 8 and the seat surface 6 remains constant or lies within a predetermined optimum range. The seat control device 12 can furthermore be designed so as to detect changes in the loading data BD and take these into account when determining the control dataset AD in order to capture movements of a person located on the seat 4. The seat control device 12 can moreover be configured so as to capture driver behavior and also to take the driver behavior into account when determining the control dataset AD.

The seat control device 12 transmits the control dataset AD to the seat control system 14 which then activates the respective drive, for example to actuate and thereby adjust the seat height of the seat surface 6, the rake of the backrest 8 and the headrest 10. For this purpose, the seat control system 14 generates control data SD for activating the respective drive for adjusting the seat height of the seat surface 6, the rake of the backrest 8, and the headrest 10 as well as other possible adjustments.

Figure 3:
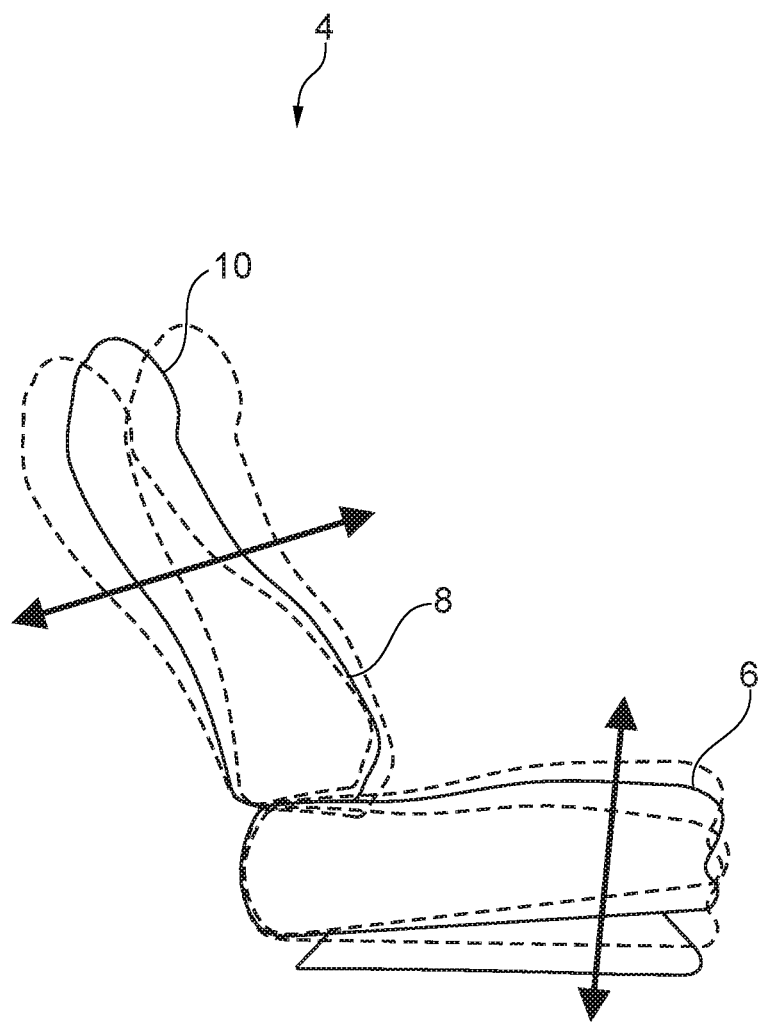
FIG. 3 is a seat movement model for adjusting the seat shown in FIG. 2 with the seat controls.
Figure 4:
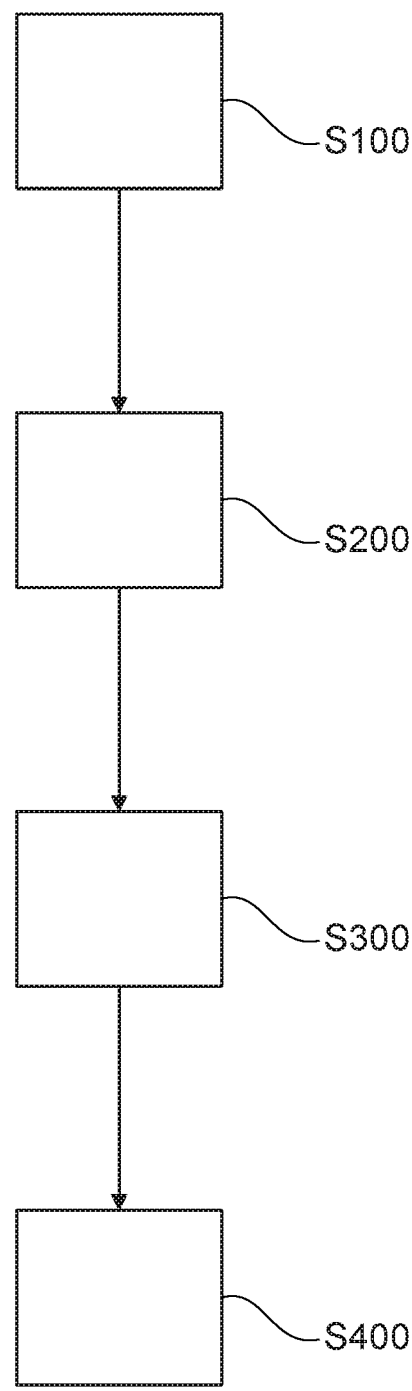
FIG. 4 is a flow diagram of an exemplary embodiment of a method for adjusting the seat during operation of the vehicle shown in FIG. 1.

The manner of operation is now explained with reference additionally to FIGS. 3 and 4. In a first step S100, the loading data BD captured by the pressure sensor module 8 are read by the seat control device 12. Then, in a second step S200, the seat control device 6 determines the control dataset AD to periodically adjust the seat 4. For example, evaluation of the control dataset AD shows that a ratio of a pressure distribution on the backrest 16 and the seat surface 14 does not remain constant or does not lie within a predetermined optimum region.

Then, in a further step S300, the seat control device 12 determines the control dataset AD such that the latter specifies a seat movement model of the seat, in the present exemplary embodiment of the seat surface 6 and of the backrest 16 with the headrest 18, which model ensures that the ratio of a pressure distribution on the backrest 16 and the seat surface 6 remains constant and lies within a predetermined optimum range.

The seat control device 12 then, in a further step S400, transmits the control dataset AD to the seat control system 12 which then activates the respective drive for adjusting the seat height of the seat surface 6 and the rake of the backrest 16 with the headrest 18, using the control data SD.

Subsequently, the seat height of the seat surface 6 and the rake of the backrest 16 with the headrest 18 is then changed periodically at a predetermined interval in order to obtain a seat movement model for adjusting the seat.

Specific characteristics of the respective people located on the seat 4 can thus be taken into account by capturing and evaluating the loading data BD so that changing the seat position can be configured in a personalized fashion.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for adjusting a seat of a vehicle, comprising the steps of:
    capturing loading data of the seat with a pressure sensor module having multiple pressure sensitive elements arranged in a grid pattern, wherein the load data contain data on pressure distribution on the seat in at least two dimensions;
    evaluating the loading data to determine a control dataset; and
    periodically adjusting the seat with a control device based on the control dataset, wherein driver behavior is captured and used when determining the control dataset, and wherein the captured driver behavior comprises depressing a pedal while a person is located on a front position of the seat.

2. The method as claimed in claim 1, wherein the pressure sensor module comprises multiple pressure-sensitive fiber optic cables as the multiple pressure sensitive elements.

3. The method as claimed in claim 1, wherein the control dataset contains data relating to a seat movement model.

4. The method as claimed in claim 1, wherein changes to the loading data are captured and evaluated.

5. A seat control device for adjusting a seat of a vehicle, wherein the seat control device is configured to capture loading data of the seat with a pressure sensor module having multiple pressure sensitive elements arranged in a grid pattern, wherein the load data contain data on pressure distribution on the seat in at least two dimensions, wherein the seat control device further evaluates loading data of the seat in order to determine a control dataset, and to periodically adjust the seat based on the control dataset, wherein driver behavior is captured and used when determining the control dataset, and wherein the captured driver behavior comprises depressing a pedal while a person is located on a front position of the seat.

6. The seat control device as claimed in claim 5, wherein the pressure sensor module comprises multiple pressure-sensitive fiber optic cables as the multiple pressure sensitive elements.

7. The seat control device as claimed in claim 5, wherein the control dataset contains data relating to a seat movement model.

8. The seat control device as claimed in claim 5, wherein the seat control device is designed to capture and evaluate changes in the loading data.

9. A seat for a vehicle, comprising:
    a sensor capturing loading data of the seat; and
    a seat control device to evaluate the loading data of the seat and determine a control dataset, and to periodically adjust the seat based on the control dataset, wherein the sensor comprises a pressure sensor module with a pressure sensor module having multiple pressure sensitive elements arranged in a grid pattern, wherein the load data contain data on pressure distribution on the seat in at least two dimensions, wherein driver behavior is capture and used when determining the control dataset, and wherein the captured driver behavior comprises depressing a petal while a person is located on a front position of the seat.

10. The seat as claimed in claim 9, wherein the pressure sensor module comprises multiple pressure-sensitive fiber optic cables as the multiple pressure sensitive elements.

11. The seat as claimed in claim 9, wherein the control dataset contains data relating to a seat movement model.

12. The seat as claimed in claim 9, wherein the seat control device is designed to capture and evaluate changes in the loading data.

13. The seat as claimed in claim 9 further comprises a computer program product for controlling the seat.

14. The seat as claimed in claim 9, wherein the vehicle is a motor vehicle.

* * * * *